US012544247B2

(12) United States Patent
Leiniger et al.

(10) Patent No.: US 12,544,247 B2
(45) Date of Patent: Feb. 10, 2026

(54) METHOD FOR PRODUCING A CONNECTING ELEMENT

(71) Applicant: Ottobock SE & Co. KGAA, Duderstadt (DE)

(72) Inventors: Andreas Leiniger, Birkungen (DE); Julia Volkmar, Duderstadt (DE); Erik Pahl, Duderstadt (DE); Jens Volkmar, Duderstadt (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 627 days.

(21) Appl. No.: 17/482,341

(22) Filed: Sep. 22, 2021

(65) Prior Publication Data

US 2022/0008239 A1 Jan. 13, 2022

Related U.S. Application Data

(63) Continuation-in-part of application No. PCT/EP2021/058515, filed on Mar. 31, 2021.

(30) Foreign Application Priority Data

Mar. 31, 2020 (DE) .................... 102020108877.9

(51) Int. Cl.
*A61F 5/01* (2006.01)
*B33Y 50/00* (2015.01)
*B33Y 80/00* (2015.01)

(52) U.S. Cl.
CPC .......... *A61F 5/0123* (2013.01); *A61F 5/0127* (2013.01); *A61F 5/013* (2013.01); *B33Y 50/00* (2014.12); *B33Y 80/00* (2014.12)

(58) Field of Classification Search
CPC ...... A61F 5/0123; A61F 5/0127; A61F 5/013; B33Y 50/00; B33Y 80/00
See application file for complete search history.

(56) References Cited

U.S. PATENT DOCUMENTS 10,779,982 B2 9/2020 Anatoscope
2003/0153859 A1* 8/2003 Hinshon ............... A61F 5/0127
602/27

(Continued)

FOREIGN PATENT DOCUMENTS

CN 105310811 A 2/2016
FR 3054691 A1 2/2018

(Continued)

OTHER PUBLICATIONS

International Search Report and Written Opinion issued in International Application No. PCT/EP2021/058515, dated Jul. 8, 2021, 11 pgs.

*Primary Examiner* — Santosh R Poudel
(74) *Attorney, Agent, or Firm* — HOLLAND & HART LLP

(57) ABSTRACT

The invention relates to a method for producing a connecting element for connecting two components of an orthopedic device for a body part, wherein the method includes capturing three-dimensional scan data of at least one part of the body part by means of a scanner, determining a target position and/or target orientation of the connecting element relative to the body part from the scan data, modelling the connecting element using the scan data, the target position and/or the target orientation and information on the components to be connected, and producing the modelled connecting element.

20 Claims, 6 Drawing Sheets

(56) References Cited

U.S. PATENT DOCUMENTS

| | | |
|---|---|---|
| 2005/0096576 A1 | 5/2005 | Castro |
| 2005/0165337 A1* | 7/2005 | Weiss ................ A61F 5/013 |
| | | 602/20 |
| 2011/0009787 A1 | 1/2011 | Pallari et al. |
| 2013/0317788 A1* | 11/2013 | Summit .............. G06F 30/00 |
| | | 703/1 |
| 2014/0277555 A1* | 9/2014 | Meridew ............. A61F 2/32 |
| | | 623/22.12 |
| 2018/0109083 A1* | 4/2018 | Fenker ............... G06F 30/39 |
| 2019/0008562 A1* | 1/2019 | Melton ............... B33Y 50/02 |
| 2019/0304175 A1* | 10/2019 | Maresch ............. G06T 1/0007 |
| 2020/0214870 A1* | 7/2020 | Washizu ............. G16H 40/40 |
| 2020/0315755 A1* | 10/2020 | Lorenzen ............ A61C 13/30 |
| 2021/0236319 A1* | 8/2021 | Teng .................. A61F 5/01 |
| 2021/0378855 A1* | 12/2021 | Williams ............ A61F 5/0585 |

FOREIGN PATENT DOCUMENTS

| | | | |
|---|---|---|---|
| WO | WO-2017068244 A1 * | 4/2017 | ............ B63B 11/00 |
| WO | 2018148039 A1 | 8/2018 | |
| WO | 2021/055533 A1 | 3/2021 | |

\* cited by examiner

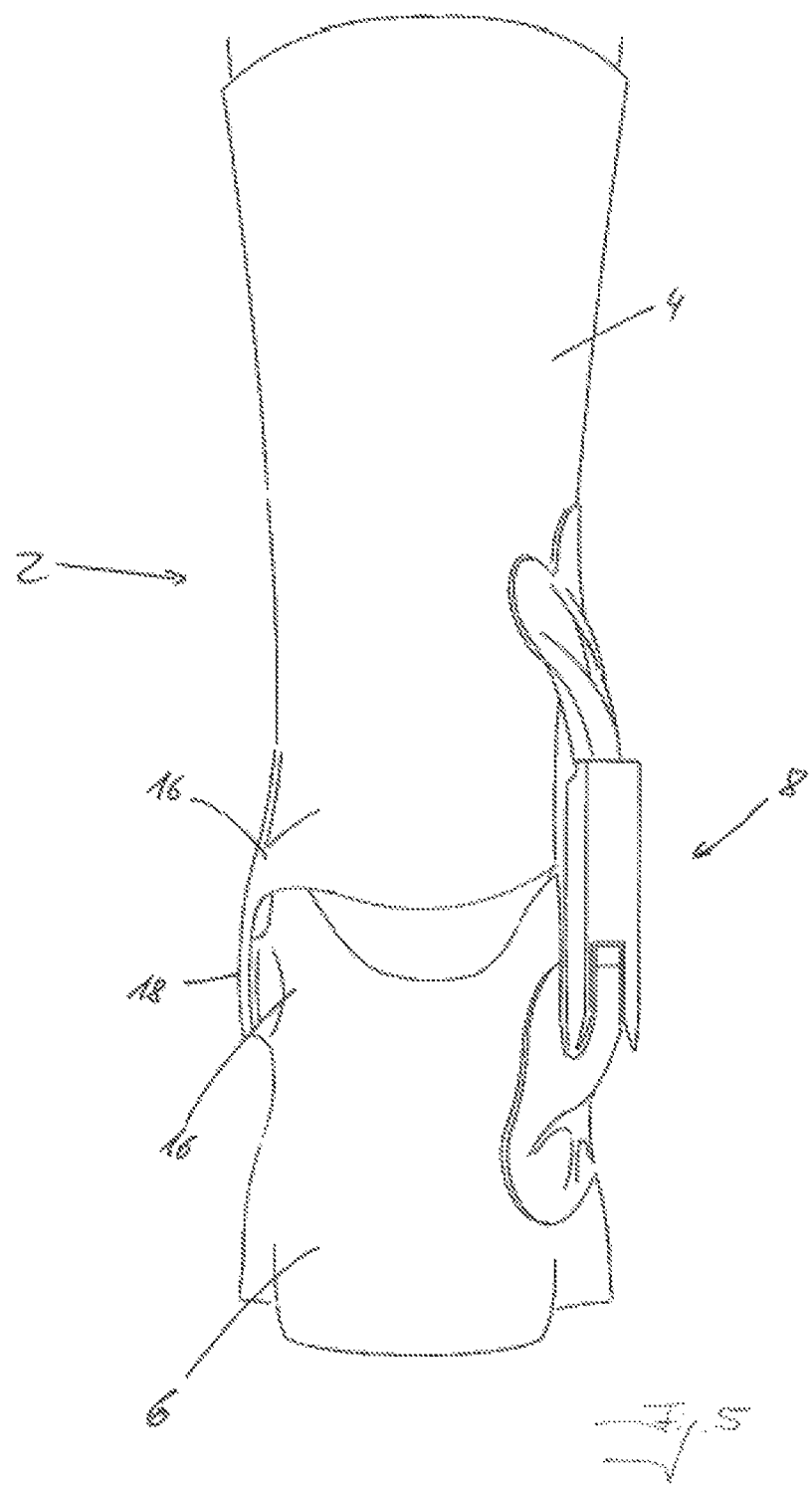

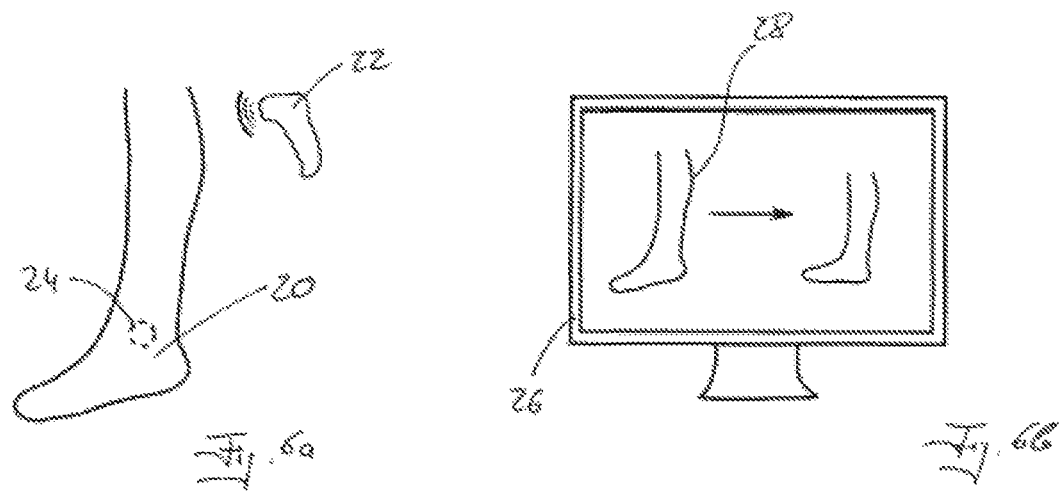
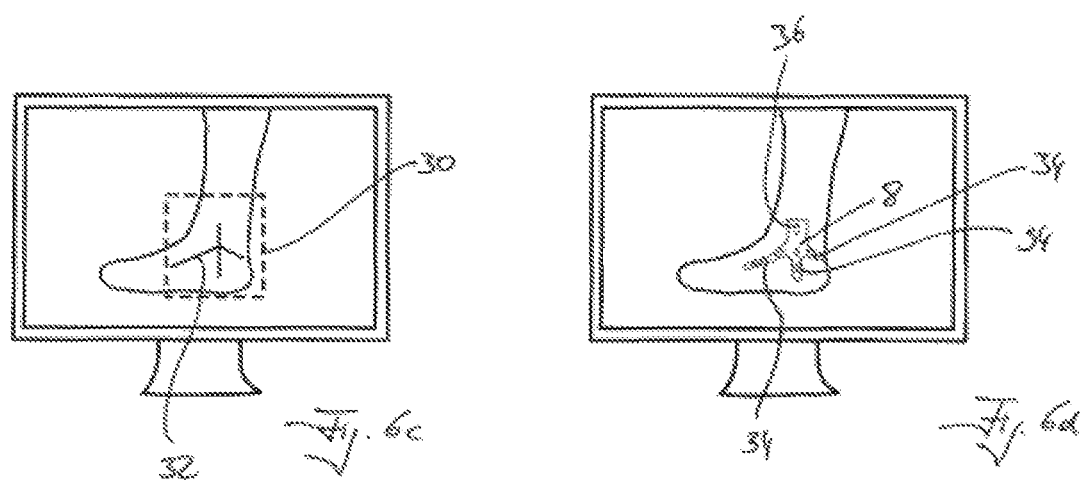
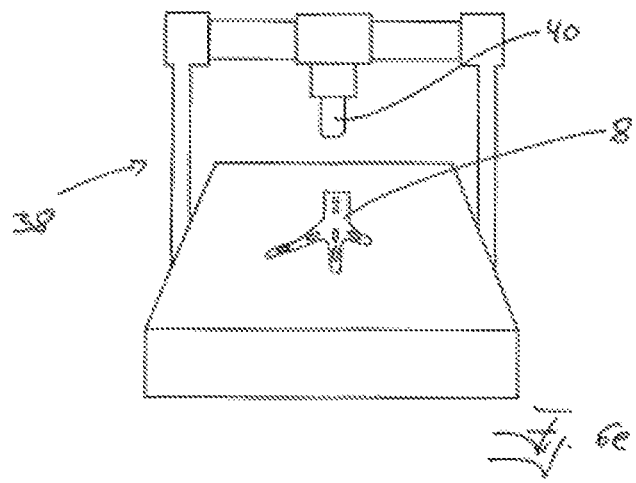

METHOD FOR PRODUCING A CONNECTING ELEMENT

CROSS-REFERENCE TO RELATED APPLICATIONS

This application is a continuation-in-part of International Patent Application No. PCT/EP2021/058515 filed Mar. 31, 2021, and claims priority to German Patent Application No. 102020108877.9, filed Mar. 31, 2020, the disclosures of which are incorporated herein by reference in their entireties.

TECHNICAL FIELD

The invention relates to a method for producing a connecting element for connecting two components of an orthopedic device for a body part. The invention also relates to a method for producing the orthopedic device.

BACKGROUND

Orthopedic devices have been known from the prior art for many years and include, for example, orthoses that protect or support an existing body part of the wearer or restrict its movement; prostheses that replace a body part of the wearer; and exoskeletons that support body parts.

An orthosis for a body part is generally arranged on this body part. For example, a knee orthosis is arranged on a knee of the wearer and an elbow orthosis on an elbow of the wearer. For the purposes of the present application, such an orthosis is designed for the respective body part. A prosthesis, on the other hand, is arranged on an existing body part of the wearer. For example, a knee orthosis can be arranged on an upper leg stump by means of a prosthesis socket. For the purposes of the present invention, such a knee prosthesis is an orthopedic device for the upper leg. For the purposes of the present invention, an orthopedic device is an orthopedic device for a body part when it is arranged on this body part or it supports, protects, braces or spans this body part. Although a knee orthosis is generally arranged on the upper leg and the lower leg, it still spans and braces the knee. As such, it can be considered and described as both an orthopedic device for the knee as well as for the upper and lower leg.

An orthopedic device is generally composed of more than two components that have to be connected to one another. Connecting elements are used to achieve this. Such elements can rigidly connect two components to each other, so that, when they are connected, the two components cannot move relative to one another. This is the case, for example, with a socket adapter that is arranged on a prosthesis socket and connects said socket to a further prosthesis element, such as a prosthetic knee or a tube element. The orientation of the two components relative to one another may be adjustable; however, in the mounted state, a relative movement is undesirable and therefore ruled out.

However, a connecting element may be designed in such a way that the two components can be moved towards each other in the connected state. This is the case, for example, if the connecting element comprises a joint or is designed as a joint. Such a joint connects, for example, an upper leg element and a lower leg element of a knee orthosis or a lower leg element and a foot element of an ankle orthosis.

In particular, if the connecting element connects components of which at least one, but preferably both, have been individually produced for the wearer of the orthopedic device, for instance as a carbon fiber composite component, the connecting element is often also adjusted to meet the individual needs and conditions. For example, a joint arm of such a connecting element is designed as a metal component that forms an even surface and is of a length that enables a sufficient connection with one of the components to be connected. This joint arm is deformed during the production of the orthopedic device in order to make it into the desired shape. This is usually done by the orthopedic technician who produces the orthopedic device. In the simplest case, the metal joint arm is bent when cold. Although this achieves the desired shape, the material is subjected to a high mechanical load, thereby reducing its stability.

To compensate for this, the connecting element is usually initially produced with a greater material thickness than would actually be necessary for the loads that occur. This increases the amount of material required and thus the cost and weight of the connecting element and also makes forming processing by the orthopaedic technician more difficult.

SUMMARY

The invention thus aims to further develop a method for producing a connecting element and an orthopedic device in such a way that the disadvantages of the prior art are eliminated or at least mitigated.

The invention solves the problem by means of a method for producing a connecting element for connecting two components of an orthopedic device for a body part, wherein the method comprises the following steps:

Capturing three-dimensional scan data of at least one part of the body part and/or at least one part of each of the two components using a scanner, Determining a target position and/or target orientation of the connecting element relative to the body part and/or relative to the two components from the scan data, Modelling the connecting element using the scan data, the target position and/or the target orientation and information on the components to be connected, and Producing the modelled connecting element.

The method according to the invention results in a connecting element that preferably no longer needs to be formed by the orthopedic technician. This means that the material thickness can be reduced to the necessary minimum, thereby reducing material usage and therefore production costs. In addition, production time for the orthopedic device is shorter, as the orthopedic technician has to complete fewer steps of the method.

First, at least one part of the body part and/or each of the two components to be connected, but preferably the entire body part and/or all the components, is/are scanned by a scanner, by way of which the three-dimensional scan data are captured. These take the form of electronic data that can be stored, for example, in a memory of an electronic data processing device. The scanner is preferably a mobile device, such as a handheld scanner. Such a handheld scanner can preferably be operated with one hand and is pointed at the body part by a person performing the method in such a way that the scan data is captured. Here, the body part and/or the respective component to be scanned is preferably irradiated with suitable scanning radiation, which is subsequently detected using a suitable detector. For example, the scanning radiation is a light pattern of visible light and/or infrared radiation and the detector a camera designed for the applied wavelength of the radiation. The scan data are preferably captured using a photogrammetric method. In other words, photogrammetry is used to capture the scan data.

Alternatively or additionally, at least one static scanner can also be used for this purpose. In this case, the body part and/or components to be scanned is/are preferably irradiated with suitable scanning radiation. A number of detectors, for example suitable cameras, are arranged around the body part and/or the component, wherein said detectors capture and image the body part and/or the component from different spatial directions. Image processing is used to determine the scan data from the individual images captured with this method. The processes and methods for capturing the scan data are very similar or even identical to those applied with a mobile scanner. However, with a static scanner, it is possible to take a number of individual images with a number of detectors, in particular cameras, at the same time or at short intervals, whereas when using a mobile scanner, a longer period of time elapses until the necessary data is acquired from the various angles and perspectives. Since the body part is preferably not moved while the scan data is being captured, the use of a static scanner is advantageous. However, it means a greater complexity of the instruments used.

Once the scan data have been captured, the target position and/or target orientation of the connecting element relative to the body part and/or relative to the components is determined. The connecting element is subsequently modelled, wherein the thus determined target position and/or target orientation is taken into account. The connecting element is thus modelled in a geometric design that renders further forming at a later point unnecessary. In particular, the space available for the connecting element is taken into account, which is determined from the scan data, i.e. the underlying physical circumstances, and the components to be connected.

The two components are preferably customized to the respective patients. This is preferably achieved by first scanning the body part that is to be treated. Alternatively or additionally, an impression is made of the body part, for example using a plaster cast. The scan data obtained in this manner and/or the impression are used to customize the components. To this end, standard components are either deformed or the individual components are already produced as customized components.

At least one of the components, preferably both components, are made of a thermoplastic. A deep drawing process is preferably used for this purpose. This is especially beneficial if an impression has been made of the body part, for example a plaster cast created. Deep drawing is then preferably performed on a positive model of the body part created from such an impression. Even if the body part has been scanned, a deep drawing process is advantageous for producing the respective component or both components. Deep drawing is then preferably performed on a rigid foam model produced according to the scan data of the body part, said model having been milled from a blank or block, for example. Due to the individual creation of the components, it is advantageous to scan them, so as to produce a matching connecting element.

Preferably, at least one of the two components, but preferably both of the components to be connected, is/are produced using data obtained by scanning the respective body part. A mobile and/or static scanner can also be used for this purpose. The data obtained in this way or the scan data are preferably used to create a so-called functional form. To this end, the data obtained in this way or the scan data are modified in such a way that an orthopedic device adjusted to these modified scan data fulfils its purpose on the actual body part as effectively as possible. This preferably occurs automatically by means of an electronic control unit, for example a software running on an electronic data processing device, that is configured to modify the scan data and thus create the functional form. In this case, the target position and/or the target orientation are then determined using the functional form that has been created. When creating the functional form, for example, a volume of a body part is changed, for example enlarged, or a position and/or orientation of a body part is adjusted to another body part. In this way, for example, the position of the foot relative to the lower leg can be adjusted and changed in relation to the actual position, which is imaged by the data obtained in this manner or the scan data obtained by scanning the body part.

In a preferred embodiment of the method, at least one marking detectable by the scanner is applied to the body part and/or to at least one of the two components, preferably to both components, before the scan data is captured. The marking is preferably affixed to the body part or the respective component or applied to the body part with a color that can be detected by means of the scanner. The important thing is that the marking is also contained and recognizable in the scan data. In particular, but not exclusively in the case that the component has been manufactured in an additive manufacturing process, at least one marking has already been applied to the component in this manufacturing process. The marking may include, for example, a coloration, an elevation and/or an indentation that can be detected by the particular scanner used.

The at least one marking preferably serves to mark points of the body part or the component that are important for the positioning of the connecting element and/or of one or both components that are to be connected by the connecting element. These points preferably mark the course and/or position of joint axes of the body part, particularly sensitive points such as sensitive soft parts, scar tissue or points at which a bone or bone end is only covered by a thin layer of tissue. If several different points of the body part or one of the components are provided with a marking, then preferably different markings are used. As a result, it is preferably possible to identify the individually marked points from the type of marking in the scan data.

Preferably, one of the components to be connected and/or the connecting element comprises a joint. The target position and/or the target orientation is preferably determined in such a way that a joint axis of the joint coincides with a joint axis of the body part. This is especially simple to achieve if the joint axis of the body part has been provided with a marking on the body part and this marking can be recognized in the scan data.

In a preferred embodiment, the scan data are captured in two different positions and/or loads of the body part and/or the two components. These different positions preferably correspond to different positions of the respective body part for which the orthopedic device is produced. This is especially beneficial if the orthopedic device is to apply a force to the body part that causes the body part to deform. Preferably, the orthopedic device is mounted on the body part without a force initially being applied. For this situation, scan data are preferably captured when the body part is not subjected to a load. The orthopedic device will only apply the desired force and the body part will only be deformed once it has been mounted. To this end, the orthopedic device can be adjusted by, for example, tensioning a strap or adjusting a joint. Alternatively or additionally, the deformation is caused by a load on the body part with the orthopedic device attached to it. This is particularly relevant for orthopedic devices in the form of prosthesis socket, in particular for the lower limb.

Preferably, a simulation of the anticipated load is performed when modelling the connecting element, the result then being included in the modelling of the connecting element. Preferably, movements of the body part on which the orthopedic device is arranged are simulated and the forces occurring are determined. The connecting element is then modelled in such a way that it withstands the forces determined. The geometric form and material thickness of the connecting element are optimized as a result, without limiting the operational safety of the connecting element. In particular, the material is tapered and/or openings are integrated into the model of the connecting element at the points where the simulation of the anticipated loads indicates a low load that allows this.

A target position and/or target orientation relative to at least one of the two components, preferably relative to both components, is preferably determined during modelling of the connecting element. To this end, a position and/or orientation of the connecting element can be varied, wherein the anticipated loads and forces are preferably determined for each new position.

Preferably, the connecting element is produced by means of an additive manufacturing process, in particular a 3D printing process. A metal and/or plastic, especially a thermoset or polymer, is preferably used as a printing material. It is especially preferable if fibers are introduced into the printed material as stabilizing elements. These may be textile fibers, natural fibers, synthetic fibers, glass fibers, carbon fibers or metal fibers. Here, a fiber is understood in particular to mean an almost one-dimensional element that thus exhibits a considerably greater expansion in a first direction, described as the longitudinal direction, than in the plane that is perpendicular to this longitudinal direction.

The fibers are preferably introduced into the printing material in a controlled manner during the additive manufacturing process. This means that the quantity and direction of the longitudinal extension of the fibers is preferably predetermined during the modelling of the connecting element. It is especially preferable if the length of the fibers to be introduced is also predetermined.

The quantity, length, material and/or longitudinal extension of the fibers to be introduced is taken into account during the modelling of the connecting element. This renders it possible to influence the stability of the connecting element in predetermined areas and in predetermined directions and thereby further reduce the amount of material required.

The invention also solves the problem by means of a method for producing an orthopedic device with at least two components that are also connected by at least one connecting element, wherein the method comprises the following steps:

Producing the connecting element according to one of the methods described here, and Connecting the two components by means of the produced connecting element.

In a preferred embodiment, the connecting element forms a joint with one of the components to be connected; in the connected state, the two components can be moved, preferably swivelled, relative to one another by way of said joint. This is advantageous, for example, when the connecting element and one of the components each feature a bore. These bores are brought into overlap with one another when the orthopedic device is fitted. An axis element, such as a screw, pin, rod or bolt, is then guided through the two bores and fixed there, so that the connecting element can be swivelled about this axis element relative to the component. If the connecting element is arranged on the other of the two components, particularly such that it is torque-proof, the two components connected by the connecting element can be swivelled relative to each other. The connecting element preferably has at least one mounting rail, but preferably two mounting rails, that are arranged on the two joint components of the joint that can be moved relative to each other. It is especially preferable if the at least one mounting rail is designed as a single piece with the respective joint component.

Preferably, the two components each feature at least one section which are arranged directly, preferably in an articulated manner, especially preferably by means of a free motion joint, against each other. In this way, for example, a free motion joint is produced. In the case of an orthopedic joint in which the connecting element is arranged on one side of the body part, for example laterally, the two sections are preferably arranged on the opposite side, for example medially. The sections are preferably arranged in such a way that, in the connected state, they reduce torsion forces, relieve the connecting element and/or enhance the stability of the orthopedic device and/or its attachment to the body part.

It is especially preferable for a fastening section of at least one of the two components to be modelled after modelling the connecting element or during the modelling of the connecting element by means of the scan data, the target position and/or the target orientation and information about the respective component. It is especially preferable for one of the two components, but especially preferably both components, to be modelled after modelling the connecting element or during the modelling of the connecting element by means of the scan data, the target position and/or the target orientation and information about the respective component.

In a preferred embodiment of the method, at least one of the two components of the orthopedic device to be produced is a fiber composite component. It is especially preferable if both components to be connected are fiber composite components. These may be carbon fiber composite components or glass fiber composite components or other composite components. In this case, it is advantageous if the connecting element is connected to the at least one component designed as a composite component, but preferably to both components designed as composite components, when connecting, and is thereby integrated into the layer structure of the respective component. Fiber composite components are made from so-called prepegs, which are usually fabric elements, for example fiber mats made of the respective fiber material. These are inserted in the desired form and usually coated with a synthetic resin that produces the fiber composite material when it hardens. The individual fiber mats are often also impregnated or coated with the synthetic resin.

When the components are in this state, the connecting element is also arranged in the form, in particular between different layers of the fiber mats of the composite material.

BRIEF DESCRIPTION OF THE DRAWINGS

In the following, some examples of embodiments of the present invention will be explained in more detail by way of the attached figures: They show.

DETAILED DESCRIPTION

Figure 1:
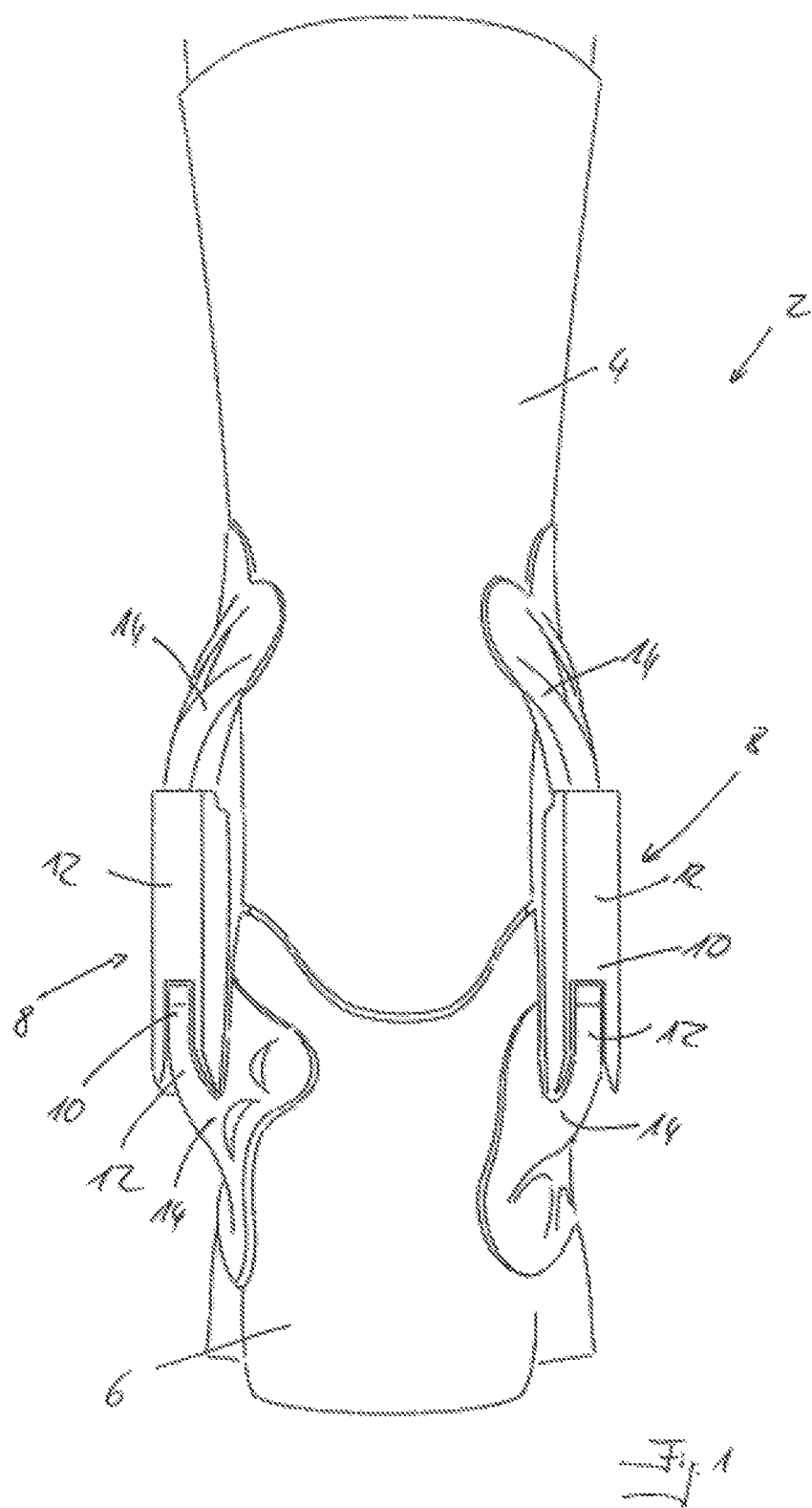
FIG. 1 a rear view of an ankle orthosis,
FIG. 2 a side view of the ankle orthosis from FIG. 1,
FIG. 3 a rear view of another ankle orthosis,
FIG. 4 a rear view of the ankle orthosis from FIG. 3,
FIG. 5 a rear view of another ankle orthosis, and
FIGS. 6a-6e schematic representations of various steps in the method.

FIG. 1 depicts an orthopedic device 2 in the form of an ankle orthosis. It comprises a first component 4 and a second component 6, wherein in the present example of an embodiment the first component 4 is arranged on a users lower leg, not depicted, and the second component 6 on a users foot, not depicted. The first component 4 and the second component 6 are connected to each other by two connecting elements 8, each of which, in the example of an embodiment shown, comprises a joint 10 with two joint components 12 that can be swivelled in relation to each other.

Each joint component 12 is connected to a mounting rail 14 or designed as a single piece with such a mounting rail 14. The connecting elements 8 are individually adjusted to the shape and orientation of the ankle, the foot and/or the lower leg of the user of the orthopedic device 2. To this end, the mounting rails 14 in the example of an embodiment shown are designed individually. Lateral and medial mounting rails of different design can be seen, which take into account the different geometries and different anticipated loads.

Figure 2:
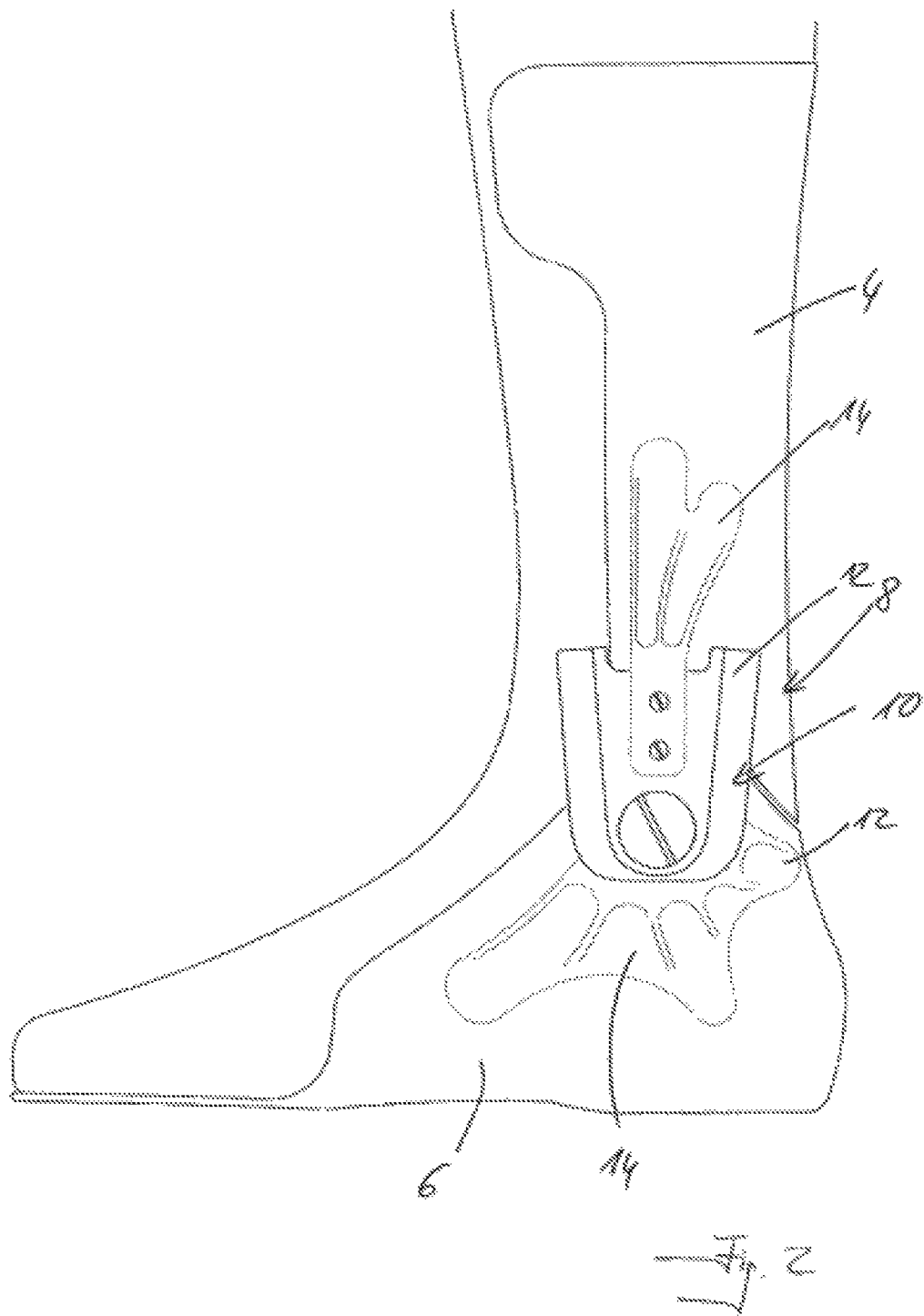

FIG. 2 shows a side view of the orthopedic device 2 from FIG. 1. The first component 4 and the second component 6 are connected via the connecting element 8 to the joint 10 and the two joint components 12. While the mounting rail 14 is screwed to the proximal, i.e. in FIG. 2 the upper, joint component 12, the mounting rail 14 is arranged in a single piece on the distal joint component 12.

Figure 3:
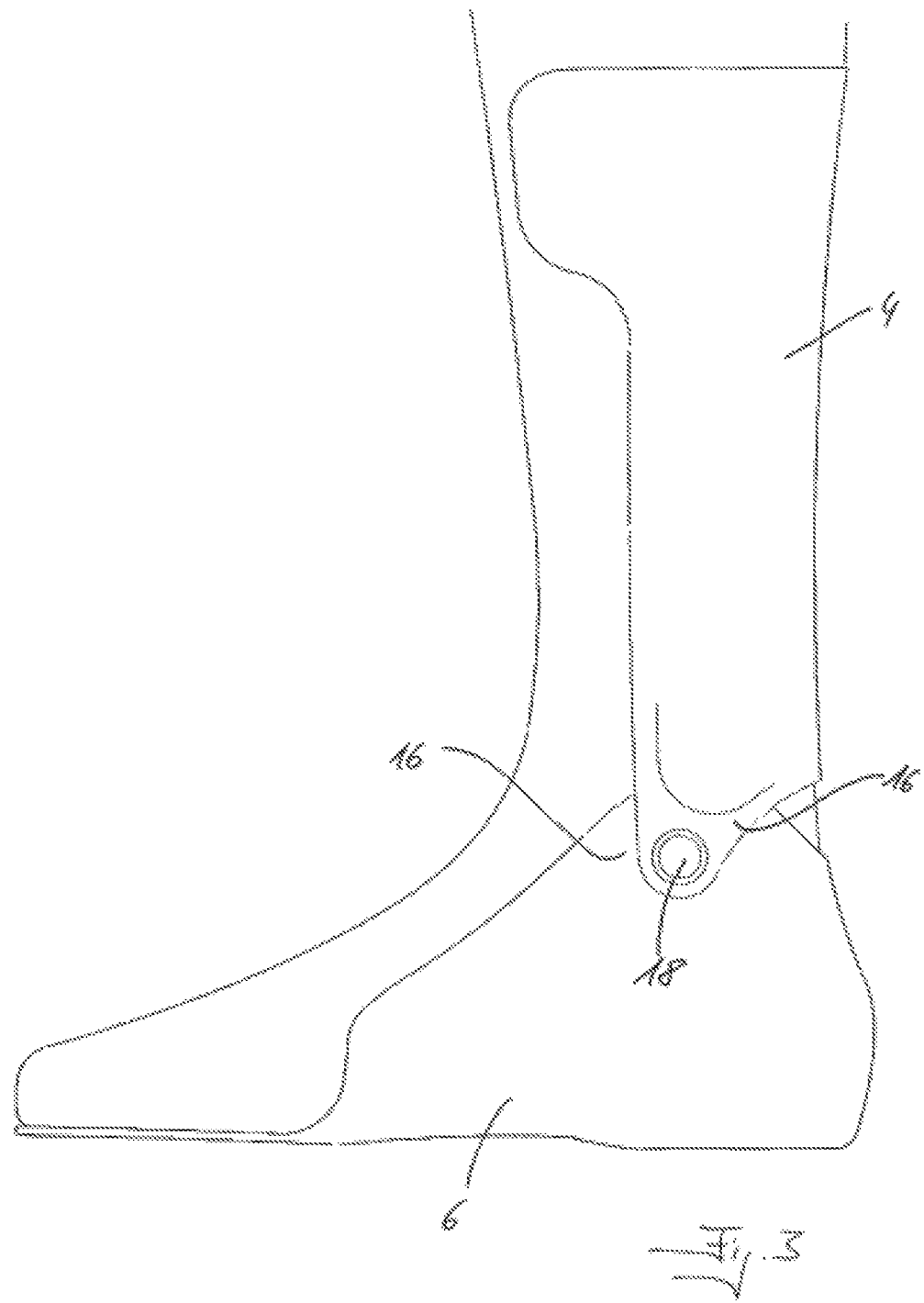

FIG. 3 depicts a side view of another orthopedic device 2. The first component 4 and the second component 6 each feature a section 16, which are directly connected to each other, and a free motion joint 18.

Figure 4:
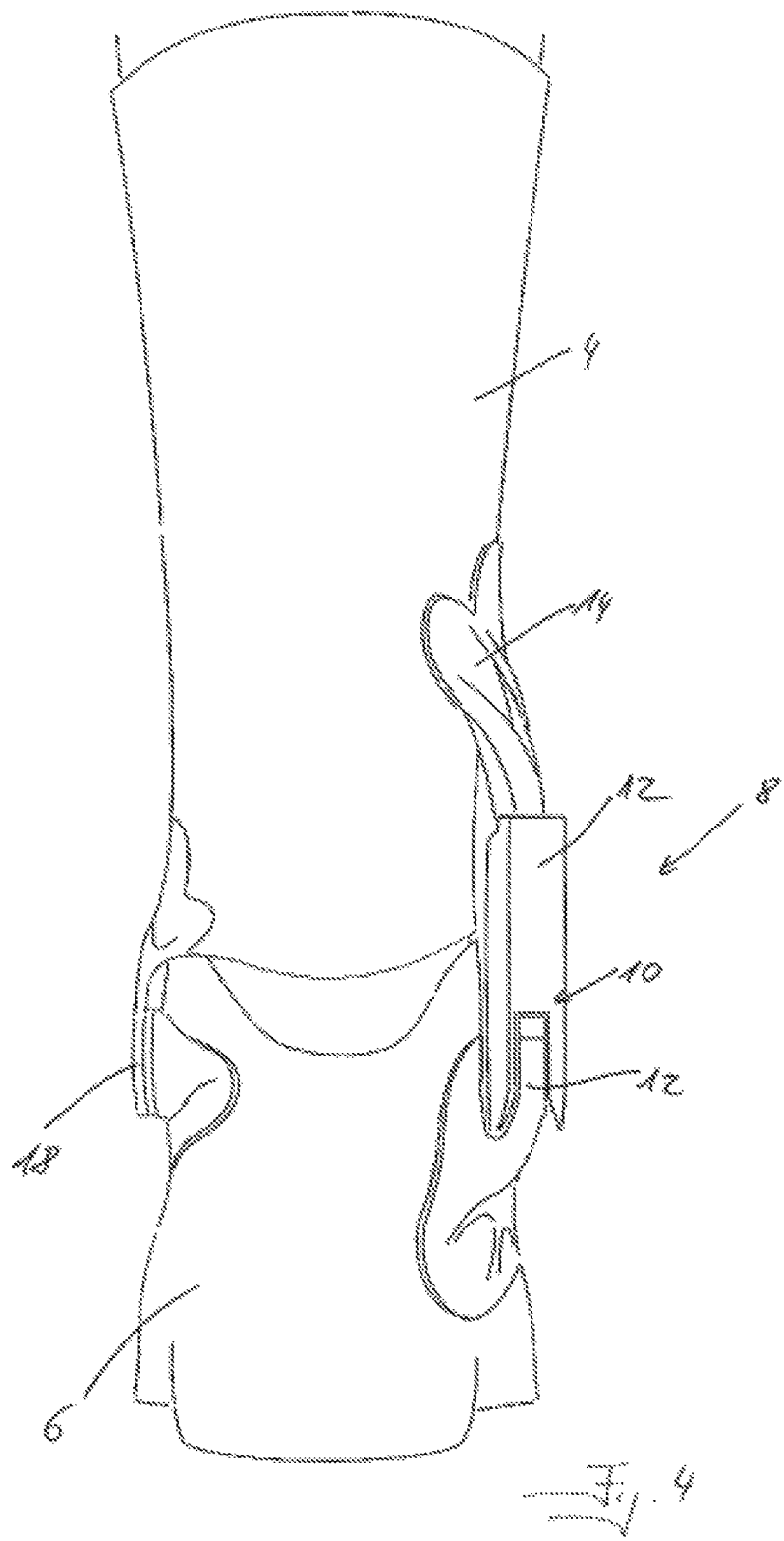

FIG. 4 shows the rear view of the orthopedic device 2 from FIG. 3. As previously shown in FIG. 3, the first component 4 and the second component 2 are directly connected to each other by the free motion joint 18 on one side, in this case medially, while a connecting element 8 is arranged on the opposite side, in this case laterally. This corresponds to the connecting element 8 from FIG. 1. It features the joint 10 with the two joint components 12 on which the respective mounting rails 14 are arranged.

FIG. 5 shows an orthopedic device 2 that corresponds to the device shown in FIG. 4. They differ in the design of the sections 16 at which the two components 4, 6 are directly connected to each other and form the free motion joint 18.

FIGS. 6a to 6e show various steps in the method. FIG. 6a schematically depicts a foot 20 that is measured and scanned with a scanner 22. Three-dimensional scan data of the foot 20 are captured, the foot representing the body part to be scanned in this case. The foot 20 features a marking 24 which represents the position of a swivel axis, in this case an ankle axis. The marking 24 is selected in such a way that it can be captured by the scanner 22 and thus forms part of the three-dimensional scan data. In an alternative design of the method, the data obtained by scanning the foot 20 are not the scan data. The scan data are obtained by scanning the two components. The data obtained by scanning the foot 20 are then used to produce one of the two components that are to be connected later. The scanned marking allows it to be applied directly to the component. The component or at least a part thereof is later scanned to obtain the scan data (28), which preferably contain the position and/or orientation of the marking and thus of the component.

FIG. 6b shows a monitor 26. This illustrates that this and the steps in the method of the following two figures are carried out by means of an electronic data processing device, in particular a computer. The left part of the monitor 26 shows the three-dimensional scan data 28 which, in the example of an embodiment shown, depict the foot 20 in precisely the position in which it was captured by the scanner. In this step of the method, a target position of the foot 20 is generated, in which the foot should be held by the orthopedic device 2 to be produced, which may be a drop foot orthosis in the example of an embodiment shown. It is clear that the forefoot area is raised. In the alternative embodiment of the method, the data of the foot 20 on which the component scanned in the method according to the invention is arranged are depicted on the monitor shown.

FIG. 6c shows that a connecting element is schematically adapted to the target data modulated in this way. Here, a target position and/or a target orientation of the connecting element 8 relative to the foot 20 is detected. This is depicted by the dashed-line box 30 and the axis system 32 within. This primary aim of this step in the method is to determine the position and orientation. Individual designs of the individual elements or components of the connecting element 8 are not determined in this step.

This occurs in the step of the method shown in FIG. 6d. The connecting element 8 is modelled on the target data of the foot 20. In the example of the embodiment shown, it has three downwardly projecting arms 34 which form fastening sections and to which the connecting element 8 is later connected to the second component 6, in this case a foot part. The connecting element 8 also comprises a fastening device 36, which also forms a fastening section and, in the example of an embodiment shown, can be fixed to a first component 4, in this case a lower leg rail.

FIG. 6e schematically depicts how the connecting element 8 is produced according to the data modulated in this way. To this end, in the example of an embodiment shown, a 3D printer 38 with at least one push button 40 is used.

REFERENCE LIST 2 orthopedic device
4 first component
6 second component
8 connecting element
10 joint
12 joint component
14 mounting rail
16 section
18 free motion joint
20 foot
22 scanner
24 marking
26 monitor
28 scan data
30 dashed-line box
32 axis system
34 arm
36 fastening device
38 3D printer
40 push button
What is claimed:

1. A method for producing a connecting element of an orthopedic device for connecting two components of the orthopedic device for a body part, wherein the method comprises the following steps:
    capturing three-dimensional scan data at least one part of each of the two components of the orthopedic device using a scanner, wherein the two components of the orthopedic device comprise two rigid components of the orthopedic device, and wherein the connecting element of the orthopedic device comprises a rigid connecting element of the orthopedic device or a joint comprising of the orthopedic device a joint axis,
    determining a target position and/or target orientation of the connecting element of the orthopedic device relative to the components of the orthopedic device and the body part from the scan data,
    modelling the connecting element of the orthopedic device using the scan data, the target position and/or the target orientation and information on the components of the orthopedic device to be connected, and
    producing the modelled connecting element of the orthopedic device.

2. The method according to claim 1, wherein at least one marking detectable by the scanner is applied to at least one of the two components of the orthopedic device before the scan data is captured.

3. The method according to claim 1, wherein at least one of the components of the orthopedic device and/or the connecting element of the orthopedic device comprises a joint of the orthopedic device.

4. The method according to claim 1, wherein the scan data are captured in at least two different positions and/or loads of the two components of the orthopedic device.

5. The method according to claim 1, wherein a simulation of the anticipated load is performed when modelling the connecting element of the orthopedic device, the result of which is included in the modelling of the connecting element of the orthopedic device.

6. The method according to claim 1, wherein the modelled connecting element of the orthopedic device is produced by an additive manufacturing process comprising a 3D printing process.

7. A method for producing an orthopedic device with at least two components of the orthopedic device, which are also connected by a connecting element of the orthopedic device, wherein the method comprises the following steps:
    producing the connecting element of the orthopedic device according to claim 1; and
    connecting the two components of the orthopedic device with the produced connecting element of the orthopedic device.

8. The method according to claim 7, wherein the two components of the orthopedic device each comprise at least one section which are arranged directly, in an articulated manner, by a free motion joint of the orthopedic device, against each other.

9. The method according to claim 7, wherein a fastening section of at least one of the two components of the orthopedic device is modelled after modelling the connecting element of the orthopedic device or during modelling of the connecting element of the orthopedic device using the scan data, the target position and/or the target orientation and information about the respective component of the orthopedic device.

10. The method according to claim 7, wherein at least one of the two components of the orthopedic device comprises a fiber composite component and the connecting element, wherein the connecting element is integrated into a layer structure of the fiber composite component.

11. A method for producing a connecting element of an orthopedic device for connecting two components of the orthopedic device for a body part, wherein the method comprises the steps of:
    applying at least one marking detectable by a scanner to at least one of the two components of the orthopedic device, wherein the two components of the orthopedic device comprise two rigid components of the orthopedic device, and wherein the connecting element of the orthopedic device comprises a rigid connecting element of the orthopedic device or a joint of the orthopedic device comprising a joint axis,
    capturing three-dimensional scan data of at least one part of each of the two components of the orthopedic device using a scanner in at least two different positions;
    determining a target position and/or target orientation of the connecting element of the orthopedic device relative to the components of the orthopedic device and the body part from the scan data;
    modelling the connecting element of the orthopedic device using the scan data, the target position and/or the target orientation and information on the components of the orthopedic device to be connected; and
    producing the modelled connecting element of the orthopedic device.

12. The method according to claim 11, wherein at least one of the components of the orthopedic device and/or the connecting element of the orthopedic device comprises a joint of the orthopedic device.

13. The method according to claim 11, wherein a simulation of the anticipated load is performed when modelling the connecting element of the orthopedic device, the result of which is included in the modelling of the connecting element of the orthopedic device.

14. The method according to claim 11, wherein the modelled connecting element of the orthopedic device is produced by an additive manufacturing process comprising a 3D printing process.

15. A method for producing an orthopedic device with at least two components of the orthopedic device connected by a connecting element of the orthopedic device comprising the steps of:
    producing a connecting element of the orthopedic device according to claim 11; and
    connecting the at least two components of the orthopedic device with the produced connecting element of the orthopedic device.

16. The method according to claim 15, wherein the at least two components of the orthopedic device each feature at least one section which are arranged in an articulated manner by a free motion joint of the orthopedic device against each other.

17. The method according to claim 16, wherein a fastening section of at least one of the two components of the orthopedic device is modelled after modelling the connecting element of the orthopedic device or during modelling of the connecting element of the orthopedic device using the scan data, the target position and/or the target orientation and information about the respective component of the orthopedic device.

18. The method according to claim 16, wherein at least one of the two components of the orthopedic device comprises a fiber composite component, and wherein the connecting element of the orthopedic device is integrated into a layer structure of the fiber composite component.

19. A method for producing a connecting element of an orthopedic device for connecting two components of the orthopedic device for a body part, wherein the method comprises the steps of:
- applying at least one marking detectable by a scanner to at least one of the two components of the orthopedic device, wherein the two components of the orthopedic device comprise two rigid components of the orthopedic device, and wherein the connecting element of the orthopedic device comprises a rigid connecting element of the orthopedic device or a joint of the orthopedic device comprising a joint axis,
- capturing three-dimensional scan data of at least one part of each of the two components of the orthopedic device using a scanner in at least two different positions;
- determining a target position and/or target orientation of the connecting element of the orthopedic device relative to the components of the orthopedic device and the body part from the scan data;
- modelling the connecting element of the orthopedic device using the scan data, the target position and/or the target orientation and information on the components of the orthopedic device to be connected and simulating the anticipated load on the connecting element of the orthopedic device; and
- producing the modelled connecting element of the orthopedic device by an additive manufacturing process.

20. The method according to claim 19, wherein at least one of the components of the orthopedic device and/or the connecting element of the orthopedic device comprises a joint.

* * * * *